United States Patent [19]
Bidwell

[11] Patent Number: 5,711,083
[45] Date of Patent: Jan. 27, 1998

[54] GAGE SET FOR MEASURING INSIDE AND OUTSIDE DIAMETERS OF RING-SHAPED PARTS

[75] Inventor: Steven T. Bidwell, Ellington, Conn.

[73] Assignee: Bidwell Corporation, Enfield, Conn.

[21] Appl. No.: 620,129

[22] Filed: Mar. 21, 1996

Related U.S. Application Data

[63] Continuation-in-part of Ser. No. 507,152, Sep. 11, 1995, abandoned.

[51] Int. Cl.$^6$ ............................. G01B 5/08; G01B 5/12
[52] U.S. Cl. ............................. 33/543; 33/783; 33/555.1
[58] Field of Search ............................. 33/783, 810, 811, 33/812, 520, 542, 543, 544, 544.1, 542.1, 549, 550, 555.1

[56] References Cited

U.S. PATENT DOCUMENTS

| | | | |
|---|---|---|---|
| 1,403,156 | 1/1922 | Gonzalez | 33/544 |
| 2,812,588 | 11/1957 | Verrant. | |
| 3,006,076 | 10/1961 | Wisti | 33/542 |
| 3,534,480 | 10/1970 | Jordan et al. | 33/543 |
| 4,160,329 | 7/1979 | Scrimshaw | 33/555.1 |
| 4,521,968 | 6/1985 | Wilermood et al. | 33/542 |
| 5,377,421 | 1/1995 | Isler. | |

FOREIGN PATENT DOCUMENTS

| | | | |
|---|---|---|---|
| 243095 | 2/1987 | Germany | 33/555.1 |
| 56-168103 | 12/1981 | Japan. | |
| 779246 | 7/1957 | United Kingdom | 33/812 |
| 818866 | 8/1959 | United Kingdom | 33/544 |

OTHER PUBLICATIONS

American Machinist, vol. 69, No. 18, Nov. 1, 1928, p. 698
Bar Gage Product Specifications, Mueller Gages Corp. San Gabriel, CA 91776 No Date.
Diameter Gage Product Specifications, L.S. Starrett Co., Athol, MA 01331 No Date.
Diameter Gage Product Specifications, Brown and Sharpe Manuf. Co., North Kingstown, RI 02852 No Date.
Diameter Gage Product Specifications, Federal Products Co., Providence, RI 02940 No Date.

Primary Examiner—Thomas B. Will
Attorney, Agent, or Firm—Richard H. Kosakowski, Esq.; Holland & Bonzagni, P.C.

[57] ABSTRACT

A gage that measures the size and out of roundness of the inside and outside diameters of ring-shaped parts comprises a centerline hub body together with a free style swing gage. The centerline hub body has extensible jaws that can be adjusted to position the body within the central opening of the part. A vertically protruding cylindrical post is located at the center of the hub body and is adapted to interface with the free style swing gage. The free style swing gage comprises a pair of parallel cylindrical rods that are adapted to fit over the centerline post. On each end of parallel rods is disposed a block, each block having a probe that protrudes downward from the block and is operable to contact a surface of the part to be checked. A front block is associated with a dial indicator connected with the probe to indicate any deviations in size or diameter of the part to be checked. The free style swing gage, together with the centerline post of the centerline hub body, allows the gage to be positioned at the actual centerline of the part. The free style swing gage is easily rotatable throughout the full 360 degree circumference of the part to be checked by grasping and rotating a handle on the rear block.

20 Claims, 4 Drawing Sheets

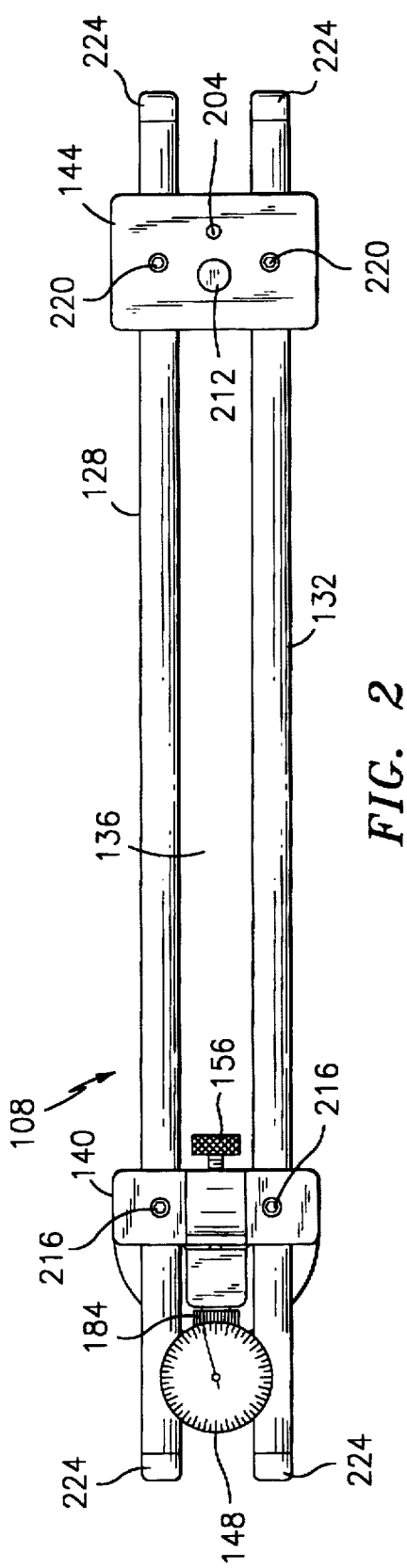

GAGE SET FOR MEASURING INSIDE AND OUTSIDE DIAMETERS OF RING-SHAPED PARTS

This is a continuation-in-part of application Ser. No. 08/507,152, filed Sep. 11, 1995 now abandoned.

BACKGROUND OF THE INVENTION

Machining facilities commonly must inspect both size and out of roundness conditions on internal and external diameters of ring-shaped parts. For example, the aerospace industry requires many ring-shaped parts to be formed with diameter dimensions held to relatively tight tolerances. The size and out of roundness inspections of these diameters are typically performed both at the machine by the operator during part fabrication and also away from the machine (e.g., at an inspection table) subsequent to part fabrication.

The most common, known prior art method for checking both size and out of roundness part conditions is to use a commercially-available, hand-held, bar-type gage. Such gages are provided by Mueller Gages Corporation of San Gabriel, Calif.; L. S. Starrett Company of Athol, Mass.; Brown and Sharpe Manufacturing Company of North Kingstown, R.I.; and Federal Products Company of Providence, R.I.

Most bar gages are constructed and are operated in a similar manner. A fixed reference probe is mounted on one end of a bar, while a spring-loaded probe is mounted on the opposite end of the bar. The spring-loaded probe mechanically interfaces with a plunger on a dial indicator. The amount of any movement of the spring-loaded probe is visually indicated on the dial indicator. To accommodate the inspection of different size parts, normally the distance between the two probes can be adjusted along with the depth of the probes below the bar.

Prior to usage of the bar gage for part inspection, the probes are adjusted to the diameter to be checked using, e.g., a master reference gage or size blocks. Then the gage is placed on the part such that the probes are either inside or outside of the wall of the part, depending on whether the inside or outside diameter of the part is to be checked. The probes contact the inner or outer surface of the wall.

Inspection of the part is performed by hand grasping the bar and rotating or "cradling" the bar back and forth over some angular dimension (e.g., 30 degrees). While the gage is being rotated, the user observes any deflection of the dial indicator. The amount of deflection of the dial indicator correlates to the dimensional amount that the part is out of round and the deviation from the desired size. The gage is then moved to a different angular position along the circumference of the wall of the part and the gage is again rotated over an angular dimension while observing the dial indicator deflection. These actions are repeated over a large portion, or all 360 degrees, of the circumference of the wall of the part, until a subjective judgement is made by the user, based on the observed dial indicator deflections, of the size and out of roundness of the inner or outer wall surface of the part.

Use of a bar-type gage has several drawbacks. The gage inherently has no means for the user to locate the gage at the actual centerline of the part. Not being located at the actual centerline of the part causes the gage to undesirably indicate incorrect size and out of roundness conditions when perhaps none exist. Thus, inherent errors in the measurement can always be present.

Also, because the bar gage is turned by hand, it is difficult, if not physically impossible, for the user to rotate the bar gage back and forth over the full 360 degrees at one time. Thus, as described above, the user must rotate the gage over several different angular portions of the part, with each portion typically being much less than 360 degrees. If the user is not careful in noting the angular portions previously covered, one or more other angular portions could easily be missed, thereby leading to an incomplete and inaccurate measurement. A full 360 degree measurement is necessary to obtain the most accurate reading.

Further, this repeated cradling is relatively time consuming, which is problematic in a production-type environment where a large number of parts must be quickly and accurately checked. This added time translates into increased labor costs, which could cause the machine shop utilizing the bar gage as its means of inspection to lose out in getting the job in the first place.

Still further, since the bar gage relies on spring-loaded tension in the probes to position and guide the gage relative to the wall of the part, the gage can apply an undesirable force to the wall of the part, whereby the force can easily distort the concentricity or roundness of the part being measured. This leads to further inaccuracies in the measurement.

Finally, the bar-type gage typically is limited in the amount of available adjustment of the distance between the two probes and the depth of the probes. Thus, to be able to inspect the size and out of roundness of parts whose diameters and depths can vary over several inches, different size models of a bar gage must be purchased by the machine shop.

Besides the hand-held, bar-type gage, which represents a relatively simplistic and conventional approach to inspecting size and out of roundness conditions of ring-shaped parts, it is also known to use a very expensive and elaborate computerized coordinate measurement machine. However, besides cost, a major drawback with this scheme is the time it takes to both train someone to use the machine and to make an actual inspection of a part.

Thus, until now, there has been a long-felt but unsolved need in the art of measurement gages to develop a gage that is inexpensive, hand-held, easy to use, easy to learn how to use, and is one that makes fast and accurate measurements of both the size and out of roundness conditions of a ring-shaped part.

Accordingly, it is a primary object of the present invention to provide a gage that makes quick and accurate measurements of the size and out of roundness conditions of a ring-shaped, machined and/or ground part.

It is a general object of the present invention to provide the gage that owes its accuracy to the fact that it is always located at the actual centerline of the part, as opposed to prior art bar-type gages where there was no means provided with the gage for locating the gage at the actual centerline of the part.

It is a further object of the present invention to provide the gage that allows a full 360 degree rotation at one time, which, when combined with the fact that the gage is always located at the centerline of the part, insures an accurate reading of size and out of roundness of the part.

It is still another object of the present invention to provide the gage with increased accuracy, since the gage does not utilize spring-loaded tension with its probes, thereby eliminating the problem with prior art gages where a thin-walled part could be distorted due to this spring-loaded tension.

Another object of the present invention is to provide the gage that allows for relatively much greater adjustment in its diameter measuring capabilities as compared to prior art bar gages, thereby eliminating the need to keep an inventory of different models to accommodate parts of widely disparate diameters and depths to be checked.

It is yet another object of the present invention to provide the gage that results in considerable savings of labor time and cost in a part machining production environment.

Still another object of the present invention is to provide the gage that easily and quickly can be made to revolve around the entire 360 degree circumference of either the inside surface or the outside surface of the part, to thereby provide an easily visible indicator of the size and out of roundness of the entire part, thereby providing for an objective determination by the user of whether the part has been machined within tolerance conditions, and also eliminating the subjective determination of size and out of roundness required when using the aforementioned prior art bar-type gage.

It is yet another object of the present invention to provide the gage that comprises a "set", including a centerline hub body with a centerline post, and a free style swing gage, in which the centerline post is interchangeable with the body to accommodate different part heights or depths.

Still another object of the present invention is to provide the gage with the centerline hub body and free style swing gage components designed using light-weight construction for ease of handling, yet made for long lasting wear at areas where the gage components contact the part to be inspected.

It is still another object of the present invention to provide the gage with the free style swing gage that disassembles for easy compact storage.

Still another object of the present invention to provide the gage with the centerline hub body having master jaws that are easily and accurately adjustable with standard shop tools such as, e.g., calipers or depth micrometers.

The above and other objects and advantages of this invention will become more readily apparent when the following description is read in conjunction with the accompanying drawing.

SUMMARY OF THE INVENTION

To overcome the deficiencies of the prior art and to achieve the objects listed above, the Applicant has invented an adjustable gage that is positionable at the actual centerline of a ring-shaped part, and quickly and accurately measures the size of the part and certain conditions of the part, such as out of roundness.

According to a preferred embodiment, the gage of the present invention comprises two separate components. A first component is a centerline hub body that comprises a centrally-located body with a cylindrical post protruding up vertically from the center of the body. The hub body has three slots formed therein into which three corresponding master jaws are adjustably positioned. Associated with each master jaw is an extensible jaw that can be adjusted in its position with respect to the master jaw.

A second component of the gage of the present invention is a free style swing gage that comprises a pair of cylindrical slide bars that are parallel oriented. Front and rear blocks are positioned on the corresponding ends of the two slide bars. The blocks are adjustable to predetermined positions along the slide bars. The front block has associated with it a dial indicator and a corresponding movable probe, together with a manually-adjustable screw to allow for adjustment of both a pivotable portion of the block and the indicator. The dial indicator visually indicates any movement of the probe. The rear block also has a probe associated therewith; however, the probe is fixed in position.

In use, the master jaws of the hub body are adjusted using, e.g., a depth micrometer or vernier calipers, to the approximate inner diameter of the part to be located within. This is always the case regardless of whether the gage is used to inspect the inside or outside diameter of a part. The hub body is then placed on a flat surface and the part to be checked is placed over the top of the body. The jaws will guide the part into position, thereby creating an actual centerline between the part and the centerline post of the hub body.

Next, the front and rear blocks of the free style swing gage are adjusted to the approximate value of inside diameter or outside diameter to be checked. Then, the two parallel slide bars of the free style swing gage are straddled over the centerline post such that the post is located in the slotted opening between the two bars, and the probes associated with the from and rear blocks are positioned at the diameter of the part to be checked. In this position, the front and rear blocks will be resting on the top surface of the part.

To check the size and out of roundness of the part, the user merely rotates the free style swing gage around the centerline post of the hub body by grasping and rotating a vertical handle protruding up from the rear block. As the free style swing gage rotates, the probes are in contact with the inner or outer surface of the part. The user observes any needle movement of the dial indicator to arrive at a quick and accurate objective judgement as to whether the part is within dimensional specifications.

BRIEF DESCRIPTION OF THE DRAWINGS

FIG. 2 illustrates a top view of a free style swing gage component of the gage of FIG. 1;

FIG. 3 illustrates a side view of the free style swing gage of FIG. 2;

DETAILED DESCRIPTION OF THE PREFERRED EMBODIMENTS

Figure 1:
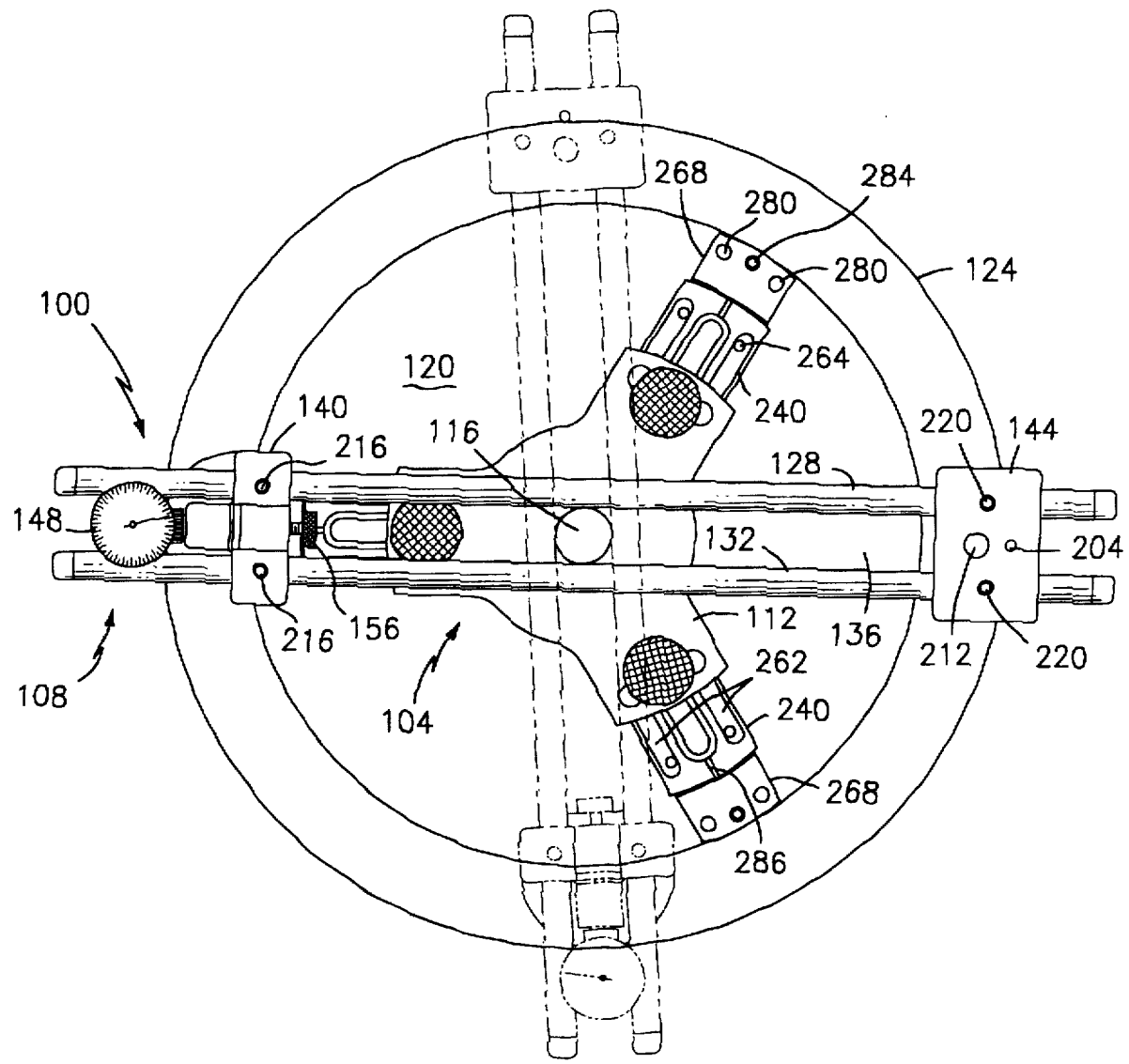
FIG. 1 is a top view showing the gage set of the present invention in use with a ring-shaped part.

Referring to the drawings in detail, various preferred embodiments of a gaging device according to the present invention are described and illustrated therein in which the gage is generally designated by the reference numeral 100. In one preferred embodiment, the gage 100 comprises a "set" of two separate components: a centerline hub body 104 and a free style swing gage 108. The centerline hub body 104 comprises a centrally-located body 112 with a cylindrical post 116 protruding up vertically from the center of the body 112. As illustrated in FIG. 1, the centerline hub body 104 is disposed within the centrally-located opening 120 of a ring-shaped part 124. The free style swing gage 108 has a pair of cylindrical slide bars 128, 132 that position the free style swing gage 108 over the cylindrical post 116 of the centerline hub body 104. As illustrated in FIG. 1, the free style swing gage 108 can be rotated about the centerline hub body 104 to obtain measurements of the size and out of roundness of the ring-shaped part 124.

Figure 4:
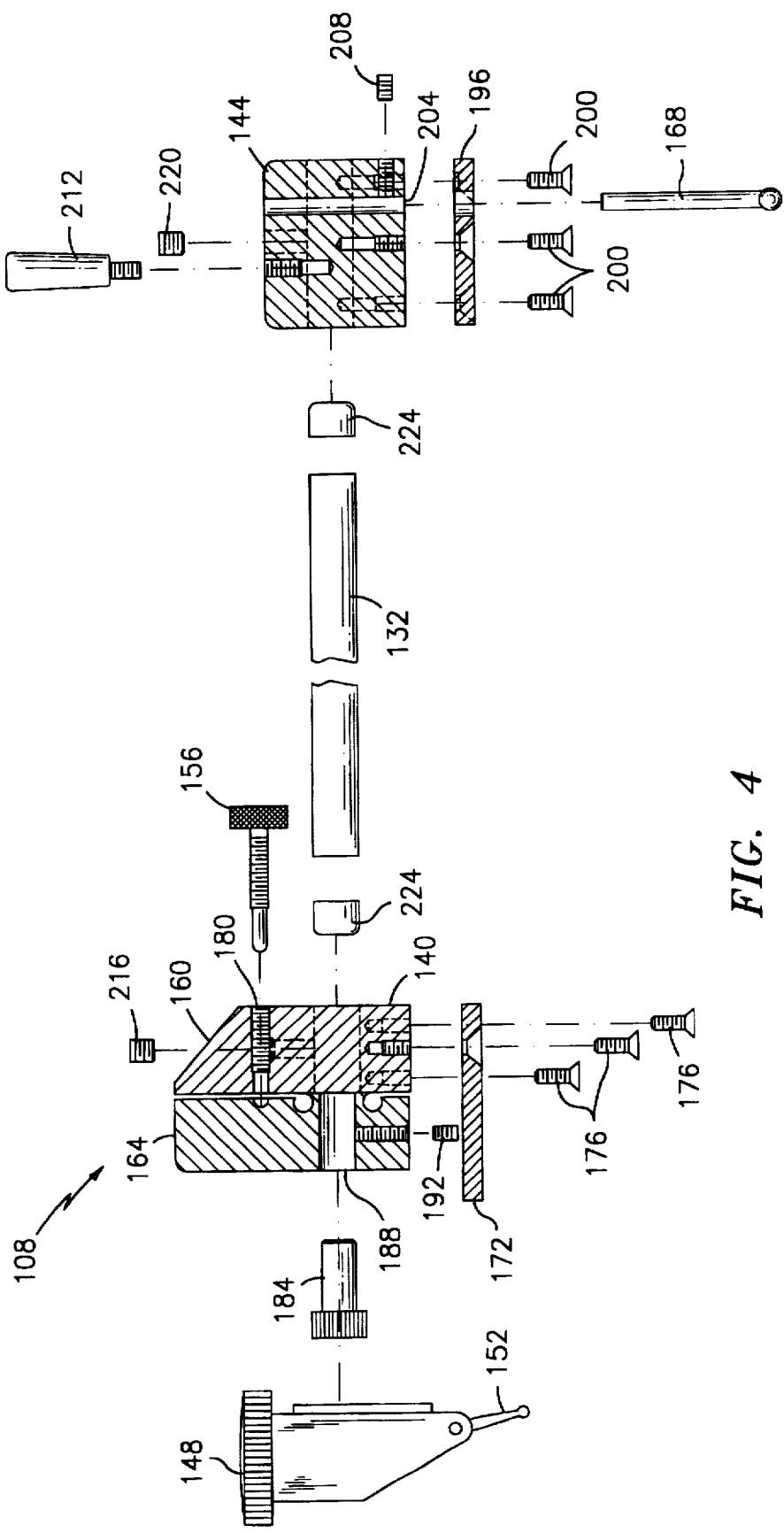
FIG. 4 illustrates an exploded view showing the free style swing gage component of FIGS. 2 and 3 in a disassembled condition.

Referring to FIGS. 2-4, there illustrated is a preferred embodiment of the free style swing gage 108 component of the gage "set" 100. The pair of cylindrical slide bars 128, 132 are parallel oriented such that an opening 136 is created therebetween. The size of this opening 136 is selected to correspond to the diameter of the cylindrical post 116 of the centerline hub body 104. Also, the bars can be of any suitable length. As described in greater detail hereinafter, in use the post 116 fits into this opening 136.

Front and rear blocks 140, 144 are positioned along the slide bars 128, 132. The blocks 140, 144 are adjustable to predetermined positions along the slide bars 128, 132, wherein the positions depend upon the inside or outside diameter of the part 124 to be checked. The front block 140 has associated therewith a dial indicator 148, commercially-available, and a corresponding adjustable probe 152, together with a manually-adjustable screw 156 set in a fixed portion 160 of the front block 140. Any deflection of the probe 152 is indicated by the dial indicator 148. In contrast to the prior art, bar-type gage which utilized a spring-loaded probe, the probe 152 associated with the front block 140 is not spring-loaded. This eliminates the possibility of deforming a thin-walled part, as was possible in the prior art. In the gage 100 of the present invention, the only tension applied to the part 124 is that applied by the probes 152, 168. Relative to the spring-loaded probes of the prior art, this mount of tension is relatively much smaller.

The screw 156 allows for adjustment of a pivotable portion 164 of the block 140 and, thus, also for adjustment of probe 152 and the indicator 148. That is, adjustment of the screw 156 allows for "zeroing" of the dial indicator 148. The rear block 144 has a fixed probe 168 associated therewith. The blocks 140, 144 easily disassemble from the bars 128, 132 for compact storage.

Referring particularly to the exploded view of the free style swing gage 108 in FIG. 4, the front block 140 has a lower contact plate 172 fastened to the block 140 by a plurality of flat head screws 176 that fit into tapped holes in the block 140. This plate 172 is preferably formed out of steel (e.g., Rockwell 40 minimum heat treated steel) since the lower surface of this plate 172 will be in contact with the part 124 to be inspected. Other part contact points (described hereinafter) on the gage 100 may also be preferably formed from such steel to provide for long-lasting wear of the gage 100. These and other parts may also have a protective finish applied thereto for appearance purposes and as a prevention against rust and corrosion.

The adjustment screw 156 comprises a fine pitch, knurled head screw that is screwed into a tapped hole 180 formed along the entire width of the fixed portion 160 of the block 140. This tapped hole 180 extends briefly into the adjustable or pivotable portion 164 of the front block 140. A stem 184 with dovetail and knurled clamping ring is slip fit (i.e., with no drag or excessive looseness) into a hole 188 in the pivotable portion 164 of the front block 140. The stem 184 is held in place with a set screw 192. The dial indicator 148 slides into mating dovetail in the stem 184 and is held in position by a clamping ring that is part of the stem 184.

As shown in FIG. 4, the pivotable portion 164 of the block 140 is physically connected with the fixed portion 160 of the block 140 at a relatively small point. Manual adjustment of the screw 156 allows for adjustment of the pivotable portion 164 with respect to the fixed portion 160, and also for adjustment of the probe 152 and, thus, the reading on dial indicator 148.

The rear block 144 has a steel contact plate 196 fastened to the block 144 by a plurality of flat head screws 200 that fit into corresponding tapped holes in the block 144. The rear block contact probe 168 is slip fitted into a corresponding hole 204 formed in the block 144. The probe is held in place by a set screw 208. A handle 212 screws into a tapped hole in the top of the rear block 144. This handle 212 may revolve with respect to the block 144.

Both the front block 140 and rear block 144 have holes formed throughout the entire width of each block to accommodate a slip fit of the cylindrical bars 128, 132 therein. Thus, the blocks 140, 144 are allowed to slide relative to the length of the bars 128, 132. Each block 140, 144 has a corresponding pair of set screws 216, 220 to allow the blocks to be fixed with respect to the bars 128, 132. End caps 224 are provided for each bar 128, 132.

Figure 6:
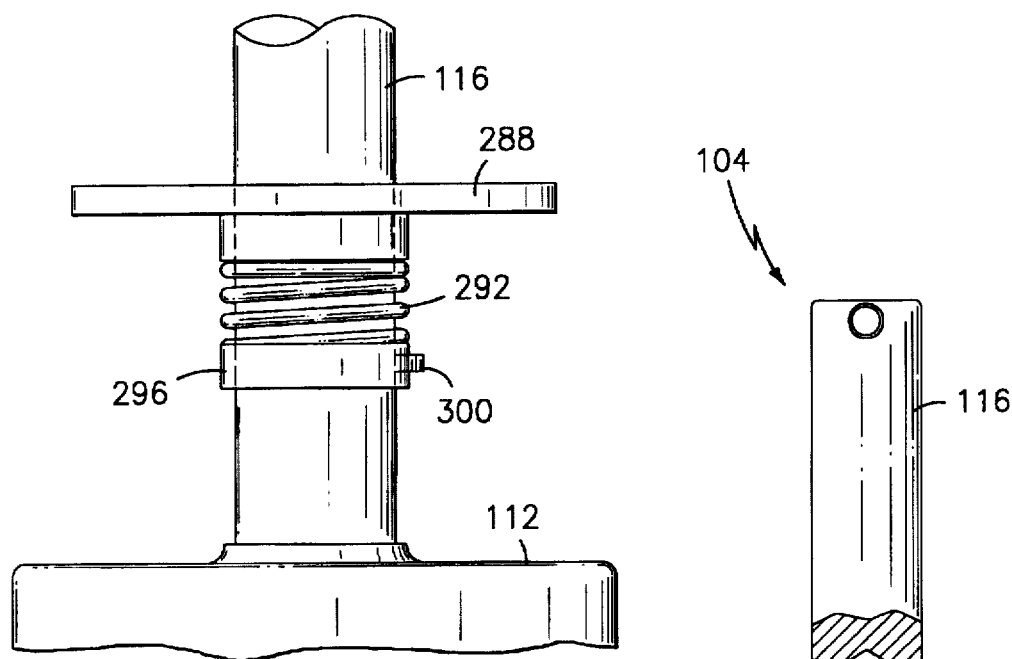
FIG. 6 illustrates an alternative embodiment of a portion of the centerline hub body of FIG. 5.
Figure 5:
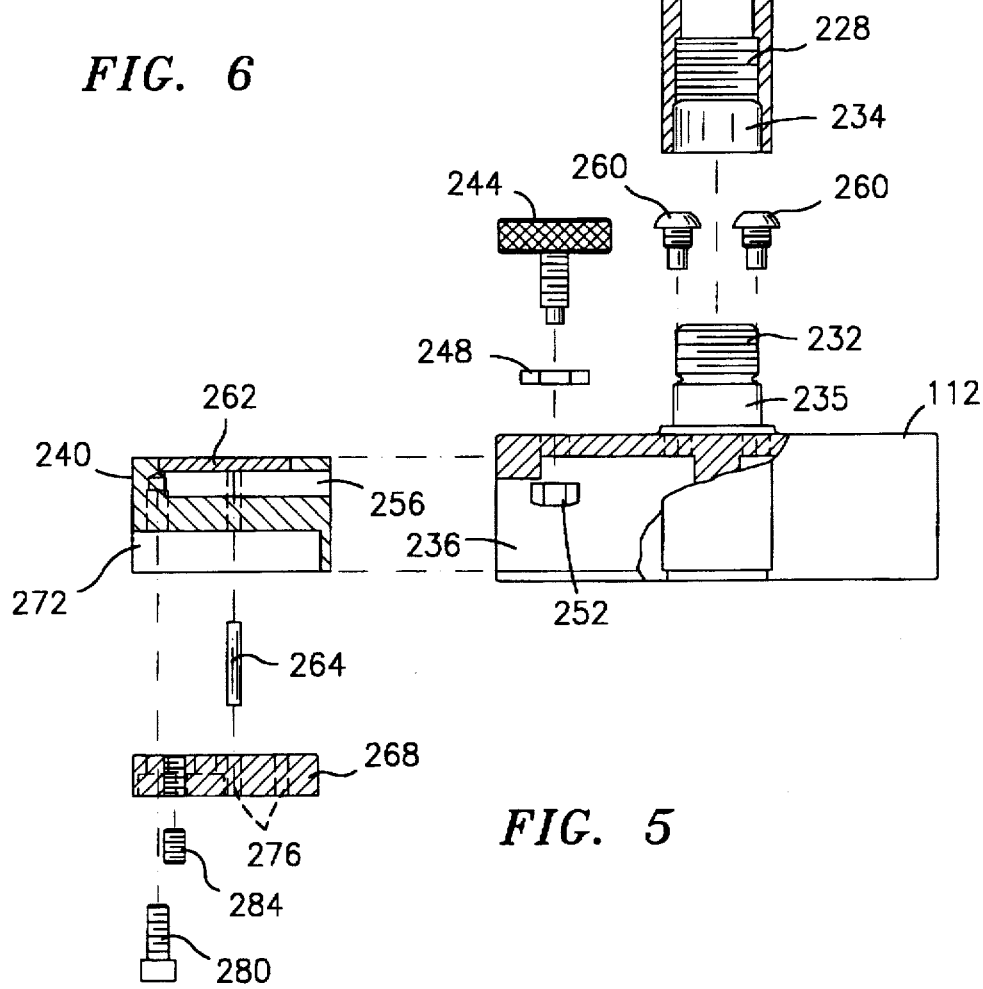
FIG. 5 illustrates an exploded view of the centerline hub body component of the gage of FIG. 1.

Referring to FIGS. 1, 5 and 6, the centerline hub body 104 comprises the centrally-located body 112 with the interchangeable cylindrical post 116 protruding up vertically from the center of the body 112. The post 116 is interchangeable in that a plurality of different posts may be utilized, with the primary difference between the posts being the length of the post, which correlates into the height that the post 116 achieves above the body 112. Thus, posts 116 of different heights can be used to accommodate various parts 124 with different depths or heights. Each post 116 has an internal threaded hole 228 formed at the bottom of the post 116. The threaded hole 228 mates with a threaded stud 232 on the hub body 112. The alignment between the post 116 and the hub body 112 is obtained by a close tolerance counterbore 234 formed in the center of the post 116 at the bottom end thereof and by a pilot diameter 235 formed on the end of the hub body 112 at the bottom of the threaded stud 232.

In an exemplary preferred embodiment, the hub body 112 has three slots 236 formed therein by, e.g., milling, into which are slidably positioned three corresponding master jaws 240. The master jaws 240 are each held in a desired position in the slots 236 by associated knurled head screws 244, washers 248, and square nuts 252. Each nut 252 fits into, and is held in place in, a clearance slot 256 formed in each master jaw 240. Six modified round head stove bolts 260 (two for each master jaw 240) are screwed into tapped holes (not shown) formed in the hub body 112. These bolts 260 (which are shown rotated 120 degrees for clarity in FIG. 5), protrude far enough down into the milled slots 236 to act as stops for sliding the master jaws 240 in and out of the slots 236. Each master jaw 240 has a pair of clearance slots 262 formed in the top of the jaw 240 to accommodate the bolts 260.

Associated with each master jaw 240 are a pair of dowel pins 264 that are press fit using force into corresponding holes formed in the master jaws 240. Each master jaw 240 has an extension jaw 268 that fits into a slot 272 formed in the bottom of each master jaw 240. Each extension jaw 268 has a pair of corresponding holes 276 formed therein into one of which the dowel pin 264 is slip fit. Each extension jaw 268 is also held in place with respect to the corresponding master jaw 240 by two socket head cap screws 280 that are screwed into one pair of holes formed through the entire thickness of the extension jaw 268 and partially into the corresponding master jaw 240. Each extension jaw 268 has a set screw 284 provided for support that screws into a tapped hole in the extension jaw 268.

To set-up and operate the gage 100 of the present invention, the inside diameter of the part 124 to be checked is determined and the master jaws 240 are adjusted for this diameter using standard machine shop tools such as, e.g., a depth micrometer or vernier calipers. Setting the master jaws 240 for the inner diameter of the part 124 is always the case regardless of whether the gage 100 is used to inspect the inside or outside diameter of a part 124. This is because the centerline hub body 104 of the gage 100 of the present invention is always inserted within the inside opening of the part 124.

In an exemplary case of a part 124 having an inner diameter of 6.010 inches, the centerline hub body 104 is "set" to a diameter of 6.000 inches by adjustment of the master jaws 240. The centerline hub body 104 is purposely set smaller that the diameter of the part 124 to be located in for clearance reasons and to allow for out of roundness conditions. Then, for an exemplary outside diameter of the hub body 112 of 4.000 inches (this diameter does not include either the master jaws 240 or the extension jaws 268), each of the three master jaws 240 in the exemplary preferred embodiment must extend 1.000 inches beyond the outside of the hub body 112.

The master jaws 240 are adjusted by loosening the three knurled head screws 244 that hold the master jaws 240 in position. Then, either a depth micrometer or vernier calipers (not shown) are set to 1.000 inches. The rod of the depth micrometer is located inside a milled slot 286 formed in the master jaw 240. Each master jaw 240 is slid into the corresponding slot 236 until it touches the base of the depth micrometer that is resting against the hub body 112. Then, each master jaw 240 is locked in place with the knurled head screw 244.

An additional 0.500 inches of adjustment on each master jaw 240 is obtained by removing the two socket head cap screws 280 and relocating the end holes 276 in the extension jaws 268 over the dowel pins 264 in the master jaws 240, and screwing the two socket head cap screws 280 through the second set of holes located more toward the middle in the extension jaws 268.

The free style swing gage 108 is then set to the approximate diameter of the part 124 to be inspected using, e.g., gage blocks or a reference master (not shown). The front and rear blocks 140, 144 are loosened and slid along the bars 128, 132 to the approximate diameter of the part 124 to be checked. The adjustment screw 156 is used to adjust the dial indicator 148 for a zero reading.

The centerline hub body 104 is then placed on a flat surface and the part 124 to be checked is placed over the top of the body 104 such that it resides within the body. The master jaws 240, or, if used, the extension jaws 268, will guide the part 124 into position, thereby creating an actual centerline between the part 124 and the centerline post 116 of the hub body 112. Then, the two parallel slide bars 128, 132 of the free style swing gage 108 are straddled over the centerline post 116 such that the post 116 is located in the slotted opening 136 between the two bars 128, 132, and the probes 152, 168 associated with the front and rear blocks 140, 144 are positioned at the diameter of the part 124 to be checked. In this position, the front and rear blocks 140, 144 will be resting on the top surface of the part 124 to be checked.

To check the size and out of roundness of the part 124, the user merely rotates the free style swing gage 108 about the centerline post 116 by grasping and rotating the handle 212. As the free style swing gage 108 rotates, the probes 152, 168 are in contact with the inner or outer surface of the part. The user observes any needle movement of the dial indicator 148 to arrive at a quick and accurate objective judgement as to whether the part is within dimensional specifications; that is, the part 124 is within size and out of roundness tolerances.

Use of the master jaws 240 and the extension jaws 268 allow the gage 100 of the present invention to be utilized on many different diameter parts. However, it is contemplated that one size of the gage 100 of the present invention has physical adjustment limitations. Therefore, for use on parts having diameters outside of those found to measurable by any one size of gage 100, other size gages 100 may be utilized, and their construction and operation should be apparent to one of ordinary skill in the art, in light of the teachings herein. Also, the centerline hub body 104 can be closed for easy storage in that the master jaws 240 and extension jaws 268 can be set to their fully closed positions.

Referring now to FIG. 6, there illustrated is an alternative embodiment of the centerline hub body 104 having a weight reduction device or mechanism added to the post 116. The mechanism could be used in cases where the weight of the free style swing gage 108 could possibly distort an extremely thin-walled part. The mechanism supports the free style swing gage 108 so that minimum downward pressure is applied to the part being inspected. The adjustment and inspection process is similar to that described hereinbefore.

The mechanism of FIG. 6 comprises a flange 288 that supports the weight of the slide bars 128, 132. A spring 292 is disposed below the flange 288 and over the outside diameter of the post 116. The lower surface or collar of the flange 288 rests on top of the spring 292. On the bottom of the spring 292 is a dog 296 that is held in a desired position on the post 116 by a set screw 300.

Referring again to FIG. 1, there illustrated is the gage "set" 100 of the present invention in use in inspecting a ring-shaped part 124. The free style swing gage 108 is shown in two rotational positions (one in phantom) with respect to the part 124. The handle 212 on the rear block 144 allows for easy and complete 360 degree rotation (and, thus, inspection of the part 124) in one motion by the user.

If the user has gone through the relatively easy set-up procedure described hereinbefore, then the centerline hub body 104 will be located at the actual centerline of the part 124. On the other hand, if the hub body 104 is not located at the actual centerline of the part, for whatever reason, then, during part inspection, as the free style swing gage 108 is rotated, the free style swing gage 108 will "slide" or move laterally relative to the centerline post 116, thereby compensating for not being located at the actual centerline and minimizing the amount of error present in the measurement of size and out of roundness.

The gage 100 of the present invention has been described in a preferred embodiment of the present invention as comprising a "set" made up of two components: the centerline hub body 104 and the free style swing gage 108. However, the invention is not to be limited as such in its broadest sense. Each component 104, 108 by itself comprises features that, in combination, are considered to be novel, based on the known, prior art gages.

Further, the gage 100 of the present invention has been described and illustrated herein for use in inspecting annular, "ring-shaped" parts 124; that is, a part having both inner and outer walls with associated surfaces. However, the gage 100 is not limited as such in its application. Generally, the gage 100 may be used to inspect the size and out of roundness conditions of any type of part 124 having a circular opening 120; for example, a block-shaped part. In that case, since only an inner circular surface exists, the gage is used to inspect only this inner surface.

The centerline hub body 104 has been described as being adjustable through use of a set of three each of master jaws 240 and extension jaws 268. However, it is to be understood that three of each type of jaw 240, 268 is purely exemplary; another number of each type of jaw may be utilized, in light of the teachings herein. Also, a master jaw 240 and a corresponding extension jaw 268 have been described as forming a pair or set of jaws. The extension jaw 268 may be of a fixed length. A relatively shorter-length extension jaw 268 may be replaced by a longer, "super extension" jaw, whose construction and operation may be similar to that of the extension jaw 268, as taught herein. The "super extension" jaw would enhance the expansion capability of the centerline hub body 104, thereby providing the user with greater flexibility in inspecting parts 124 of larger sizes.

Further, the means of adjusting these jaws 240, 268 described herein is also purely exemplary; other means for adjusting the position of the jaws 240, 268 are contemplated. Still further, it is to be understood that both types of jaws 240, 268 may be omitted entirely when it will be desired to use the centerline hub body 104 for inspecting a large number of parts 124 that have the same size opening 120. In that case, the centerline hub body 104 is non-adjustable in that it may have a circular-shaped body or, in the alternative, the hub body 112 may have protrusions or jaws that are permanently fixed during the formation of the hub body 112.

Also contemplated are enhancements to the gage 100 of the present invention where an electronic indicator (not shown) could replace the dial indicator and record data to provide statistical process control information. Also, the master jaws 240 or the extension jaws 268 could be made to expand electronically or by use of hydraulic pressure. Further, the centerline hub body 104 could be manufactured similar to a three jaw chuck that uses a stroll-type configuration. The shape or form of the hub body 104 could be altered for specific shapes or configurations.

Further, the gage 100 of the present invention may be adjustable in height through use of, e.g., a set of riser blocks (not shown) that attach to the bottom of the front and rear contact plates 172, 196. This allows the gage 100 to accommodate parts 124 of varying heights. The blocks may be of varying heights to achieve varying amounts of adjustability, and they may attach to the plates 172, 196 by magnetic or other means.

It should be understood by those skilled in the art that obvious structural modifications can be made without departing from the spirit of the invention. Accordingly, reference should be made primarily to the accompanying claims, rather than the foregoing specification, to determine the scope of the invention.

Having thus described the invention, what is claimed is:

1. A gaging device for measuring various predetermined dimensional characteristics of a part, the gaging device comprising:
   (a) a hub body operable to be spatially disposed within an opening of the part, the hub body including a centerline post; and
   (b) a free style swing gage having a rotatable member with an opening into which the centerline post is positioned, the free style swing gage having a first block that is adjustably positioned along a first portion of the rotatable member, the first block having mounted thereto an indicator with an associated probe for contacting the part, the first block having associated therewith corresponding means for adjusting a selected movement of the first block, the free style swing gage having a second block that is adjustably positioned along a second portion of the rotatable member, the second block having an associated probe for contacting the part, wherein the free style swing gage is positioned with respect to the part such that the first block probe and second block probe are both in contact with the part and the free style swing gage is rotated about the centerline post while the indicator provides an indication of the predetermined dimensional characteristics of the part.

2. The gaging device of claim 1, wherein the hub body has adjustable means for spatially positioning the hub body within the opening of the part.

3. The gaging device of claim 2, wherein the adjustable means comprises at least one extensible jaw that is slidably positionable with respect to the hub body, and wherein the extensible jaw is movable to a predetermined position and includes means for locking the extensible jaw in the predetermined position.

4. The gaging device of claim 1, wherein the rotatable member of the free style swing gage comprises at least two cylindrical rods arranged in a parallel orientation, wherein the opening of the rotatable member is disposed between the two rods, and wherein the first block and second block are slidably movable along a length of the two rods to predetermined positions selected according to the dimensions of the part to be measured.

5. The gaging device of claim 1, wherein the second block includes a handle for facilitating the rotation of the free style swing gage about the centerline post.

6. The gaging device of claim 1, wherein the first block has first and second portions connected at a pivot point, wherein the means for adjusting the selected movement of the first block comprises means for adjusting the second portion of the first block about the pivot point to a position with respect to the first portion of the first block, wherein the means for adjusting the selected movement of the first block also comprises means for adjusting a position of the first block probe with respect to the part.

7. The gaging device of claim 1, wherein the centerline post has a flange positioned with respect thereto, and wherein the free style swing gage is disposed on an upper surface of the flange.

8. The gaging device of claim 7, wherein the centerline post has disposed thereover a spring having a first end disposed adjacent to and in contact with the flange, and wherein the centerline post also includes a collar disposed adjacent to and in contact with a second end of the spring, the collar being movable along the centerline post to a predetermined position, and including means for locking the collar in the predetermined position along the centerline post, to thereby adjust the position of the upper surface of the collar at a predetermined height.

9. The gaging device of claim 2, wherein the adjustable means comprises at least one master jaw and a corresponding at least one extension jaw, the master jaw being adjustable with respect to the hub body to a predetermined position, the extension jaw being adjustable with respect to the corresponding master jaw to a predetermined position, the adjustable means further includes means for locking the master jaw and means for locking the extension jaw in the predetermined positions.

10. The gaging device of claim 1, wherein the free style swing gage is positioned with respect to the part such that the first block probe and second block probe are both in contact with an outside diameter of the part and the free style swing gage is rotated about the centerline post while the indicator provides an indication of predetermined dimensional characteristics associated with the outside diameter of the part.

11. The gaging device of claim 1, wherein the free style swing gage is positioned with respect to the part such that the first block probe and second block probe are both in contact with an inside diameter of the part and the free style swing gage is rotated about the centerline post while the indicator provides an indication of predetermined dimensional characteristics associated with the inside diameter of the part.

12. Apparatus for measuring predetermined dimensional characteristics of a part having an opening, comprising: a hub body spatially disposed within the opening of the part, the hub body including a centerline post and having adjustable means for spatially positioning the hub body within the opening of the part at a centerline of the part; and a free style swing gage having a rotatable member that is positionable and rotatable with respect to the centerline post, the rotatable member having a first block that is adjustably positioned along a first portion of the rotatable member, the first block having mounted thereto an indicator with an associated probe for contacting the part, the first block having associated therewith corresponding means for adjusting a selected movement of the first block, the rotatable member having a second block that is adjustably positioned along a second portion of the rotatable member, the second block having an associated probe for contacting the part, wherein the free style swing gage is positioned with respect to the part such that the first block probe and second block probe are both in contact with the part and the free style swing gage is rotated while the indicator provides an indication of the predetermined dimensional characteristics of the part.

13. The apparatus of claim 12, wherein the adjustable means comprises at least one extensible jaw in cooperative interaction with the hub body, and wherein the extensible jaw is movable to a predetermined position and includes means for locking the extensible jaw in the predetermined position.

14. The apparatus of claim 12, wherein the centerline post has a flange positioned with respect thereto.

15. The apparatus of claim 14, wherein the centerline post includes a spring having a first end disposed adjacent to and in contact with the flange, and wherein the centerline post also includes a collar disposed adjacent to and in contact with a second end of the spring, the collar being movable along the centerline post to a predetermined position, and including means for locking the collar in the predetermined position along the centerline post to thereby adjust the position of the upper surface of the collar at a predetermined height.

16. The apparatus of claim 12, wherein the adjustable means comprises at least one master jaw and a corresponding at least one extension jaw, the master jaw being adjustable with respect to the hub body to a predetermined position, the extension jaw being adjustable with respect to the corresponding master jaw to a predetermined position, the adjustable means further includes means for locking the master jaw and means for locking the extension jaw in the predetermined positions.

17. Apparatus for interfacing with a part having an opening, comprising a free style swing gage having a rotatable member and having a first block that is adjustably positioned along a first portion of the rotatable member, the first block having mounted thereto an indicator with an associated probe for contacting the part, the first block having associated therewith corresponding means for adjusting a selected movement of the first block, the free style swing gage having a second block that is adjustably positioned along a second portion of the rotatable member, the second block having an associated probe for contacting the part, wherein the free style swing gage is positioned with respect to the part such that the first block probe and second block probe are both in contact with the part and the free style swing gage is rotated while the indicator provides an indication of the predetermined dimensional characteristics of the part.

18. The apparatus of claim 17, wherein the rotatable member of the free style swing gage comprises at least two cylindrical rods arranged in a parallel orientation with an opening of the rotatable member disposed between the two rods, the first block and second block being slidably movable along a length of the two rods to predetermined positions, whereby the predetermined positions are selected according to the dimensional characteristics of the part to be measured.

19. The apparatus of claim 17, wherein the second block includes a handle for facilitating rotation of the free style swing gage.

20. The apparatus of claim 17, wherein the first block has first and second portions connected at a pivot point, wherein the means for adjusting the selected movement of the first block comprises means for adjusting the first portion of the first block about the pivot point to a position with respect to the second portion of the first block, wherein the means for adjusting the selected movement of the first block also comprises means for adjusting a position of the first block probe with respect to the part.

\* \* \* \* \*